Patented Feb. 9, 1943

2,310,655

UNITED STATES PATENT OFFICE 2,310,655

PROCESS AND COMPOSITION FOR PURIFICATION AND TREATMENT OF NATURAL OR SEWERAGE WATERS

Phillip C. Schneider, Columbus, Ohio, assignor of one-half to Paul B. Joyce, Columbus, Ohio No Drawing. Application September 23, 1940, Serial No. 357,952

8 Claims. (Cl. 210—23)

My invention relates to a process and composition for purification and treatment of natural or sewerage waters. It has to do, more particularly, with a novel process and composition which may be used for treating natural waters to render them fit for drinking purposes or to treat sewerage waters so as to prevent pollution of natural water courses into which such treated water may be discharged and even to render the treated sewerage waters suitable for drinking purposes.

There have been many processes and compositions suggested in the past for treating and purifying waters for the purposes indicated above. However, all of these processes and compositions suggested in the past have certain undesirable features. In many of these prior art processes, it has been customary to use chemicals which are harmful to the health. This is true particularly of processes for treating sewerage waters which are discharged after treatment into natural water courses and which may be used at a point downstream for water supply purposes. For example, it has been the practice with some processes to use chemicals which produce soluble halogens in the treated water which are poisonous and very injurious to health even though they are present in such small amounts as to render them not fatal. These chemicals are detrimental to fish and other organic stream life if not removed completely by the water purification plant downstream. The halogens are particularly detrimental to the teeth, kidneys, liver and intestines of human beings drinking such water. Even in some cases where natural waters are treated for drinking purposes by prior art processes, traces of poisonous halogens remain after treatment, either because they were initially present and were not completely removed, because they were used in the treatment process and were not completely removed, or because they were formed in the treatment process.

Another disadvantage of prior art processes and compositions resides in the fact that they have not resulted in the complete destruction of pathogenic organisms, their by-products or other organic solubles, either decay, anaerobic, toxic or virus in type. This is particularly true when the prior art processes are used in treating waters through a wide range of temperature variation. These prior art processes do not result in complete destruction of such organisms and their by-products at all temperatures.

Another disadvantage of prior art sewerage water treating processes resides in the nature of the sludges which are precipitated by such processes. These sludges are usually of the caking or cementitious types which are injurious to machinery and piping resulting in high cleaning and repair bills. Also, some of these prior art processes have not been economical in operation due mainly to the type of sludge produced which cannot be used as a high-grade fertilizer, and which interferes with proper operation of equipment and causes damage to such equipment as stated above.

One of the objects of my invention is to provide a process and composition for treating either natural (river, lake, ocean and well) or sewerage waters to precipitate all of the undesirable substances therefrom, particularly those which are detrimental to human health.

Another object of my invention is to provide a composition and a process of the type indicated which will completely destroy all pathogenic organisms, their by-products or other organic solubles, either decay, anaerobic, toxic or virus in type, and create a nascent oxygen content in the waters to replace the carbon dioxide and monoxide released from the above organics.

Another object of my invention is to provide a composition and a process of the type indicated in the preceding paragraph which will function in the manner indicated to destroy all of the said organisms and their by-products throughout a wide range of temperatures which will be encountered in the treatment of such waters during the different seasons.

Another object of my invention is to provide a composition and a process of the type indicated which will precipitate the undesirable substances from the waters and will destroy the organisms mentioned above and their by-products and will precipitate the destroyed organisms and their by-products in the form of a sludge which will have a high fertilizer value and which will not be cementitious or cake forming in its physical properties but will on the other hand be of a flaky and granular drying type.

Another object of my invention is to provide a composition for the purpose indicated which is comparatively cheap and therefore commercially practicable and a process which may be performed economically and is therefore commercially practicable.

Another object of my invention is to provide a composition and a process for the purpose indicated which is of such a nature that it may be used economically either in small installations (septic tank home use) or large installations (industrial or municipal).

Many other objects will be apparent from the following description.

According to the present invention I treat the natural waters or the sewerage waters with the novel composition which I have discovered to be very effective for this purpose. This composition consists mainly of anhydrous ferrous ammonia sulfate, marls of a special type containing preferably 90 per cent or more calcium carbonates, and white lime hydrate. The relative proportions of these three main ingredients will vary with different types of waters treated due to seasonal, natural, and other variables. However, I prefer to use the ranges indicated in the following table and with the ingredients having the chemical purity indicated in the table:

| Compounds | Chemical purity | | Percentage used | |
|---|---|---|---|---|
| | Range | Preferred | Range | Preferred |
| | Per cent | Per cent | Per cent | Per cent |
| Ferrous ammonia sulfate anhydrous | 65-100 | 76 | 2.5-20 | 10 |
| Marls | 85-98 | 90 | 25-60 | 30 |
| Lime hydrate | 85-99.5 | 93 | 25-75 | 60 |

The above-indicated composition is suitable for treating natural and sewerage waters of the type usually encountered. However, with certain special types of waters it may be desirable to use certain other compounds. For example, in the treatment of mine sludge or waters from foundries and steel works, or in other words, waters which contain a high iron and acid content, it may be desirable to use sodium carbonate. It is preferred to use the sodium carbonate of the chemical purity indicated below and in the percentage indicated below:

| Compound | Chemical purity | | Percentage used | |
|---|---|---|---|---|
| | Range | Preferred | Range | Preferred |
| | Per cent | Per cent | Per cent | Per cent |
| Sodium carbonate | 55-95 | 82 | 0.5-5 | 2.5 |

It may also be desirable to use the sodium carbonate with waters from paper pulp milling and cannery sludge treatment systems. Sodium carbonate may also be used in the disintegration of sea waters and oceanic waters. In treating oceanic waters, it may also be desirable to add sodium chloride or calcium chloride derived from brines as a means of precipitating the soluble halogen salts. The sodium chloride or the calcium chloride used for this purpose should be of the chemical purity indicated below and should be used in the percentage indicated below:

| Compounds | Chemical purity | | Percentage used | |
|---|---|---|---|---|
| | Range | Preferred | Range | Preferred |
| | Per cent | Per cent | Per cent | Per cent |
| Sodium chloride | 75-92.5 | 85 | 0.5-5 | 2.5 |
| Calcium chloride | 76-95 | 82.5 | 0.5-5 | 2.5 |

Instead of using ferrous ammonia sulfate in my composition, I may use potassium tri-basic phosphate or sodium tri-basic phosphate. These compounds should be of the chemical purity indicated below and should be used in the percentages indicated below:

| Compounds | Chemical purity | | Percentage used | |
|---|---|---|---|---|
| | Range | Preferred | Range | Preferred |
| | Per cent | Per cent | Per cent | Per cent |
| Potassium tri-basic phosphate | 60-90 | 85 | 1.5-15 | 6.5 |
| Sodium tri-basic phosphate | 60-90 | 85 | 1.5-15 | 6.5 |

The formula which I advocate for treating sewerage waters in the average sludge settler and water sewerage treatment system generally is the following:

200# (10%) 85% $FeSO_4.7H_2O(NH_3)x$
600# (30%) 98% $CaMg(OH_2)_2$ (hydrated lime)
1200# (60%) 93% $CaCO_3$-bearing high-grade marls Where it is desired to use sodium chloride and calcium chloride, the formula should be as follows:

200# (10%) 85% $FeSO_4.(NH_4)_2SO_4$
50# (2.5%) 76% $CaCl_2$
50# (2.5%) 92.5% $NaCl$
500# (25%) 98% $Ca(OH)_2.Mg(OH)_2$
1200# (60%) 93% $CaCO_3$ marl If sodium carbonate is to be used, the formula should be as follows:

200# (10%) 85% $FeSO_4.(NH_4)_2SO_4$
100# (5%) 92.5% $Na_2CO_3$
500# (25%) 98% $Ca(OH)_2.Mg(OH)_2$
1200# (60%) 93% $CaCO_3$ marl If both the chlorides and the sodium carbonate are to be used, the formula should be as follows:

200# (10%) 85% $FeSO_4.(NH_4)_2SO_4$
50# (2.5%) 95% $Na_2CO_3$
50# (2.5%) 76% $CaCl_2$-bearing salt-brine
500# (25%) 98% $CaMg(OH_2)_2$ (hydrated lime)
1200# (60%) 93% $CaCO_3$-bearing high-grade marls In each of the above-indicated formulas the same amount of K or $Na(PO_4)_3$ may be used in place of the $FeSO_4.(NH_4)_2SO_4$. In some cases the percentage of $Ca(OH)_2.Mg(OH)_2$ and that of the marls may be interchanged depending upon the sludge and water factors.

The anhydrous ferrous ammonia sulfate destroys urea and excreta amino-radicals, destroys pathogens, their by-products and their toxins. It is an aid to settlement or sludging of ($So_4$) and ($NH_3$) ions in the water being treated. Furthermore, this compound is inexpensive and is non-injurious to the health. It is important to use ferro-ammonia sulfate rather than ferrous sulfate. Ferrous sulfate or copperas alone will not completely destroy the pathogens nor completely absorb the $SO_4$ and $NH_3$ radicals. The ammonia in the ferro-ammonia sulfates will act as an agent for forming a colloidal flake sludge precipitant for the organic acids of animal and vegetable types of excreta or decay products contained in the water being treated.

The marls which I use in my composition are the nearly pure fresh-water lime deposits of animal and vegetable calcium carbonate secretions. They are preferably 90 per cent to 98 per cent pure calcium carbonate in content although the calcium carbonate content may range as low as 85 per cent with the remaining content being divided among some ten or twenty other carbonate-silicate combines the purpose of which would be only as a body to the actual treatment and sludging chemicals (in other words, a catalyst of a hastening process nature). The calcium carbonate in the marl acts as a calcium metal ionic concentration and a carbonate eliminator for natural carbonated waters; at the same time it releases nascent oxygen to replace the carbon monoxides and carbon dioxides released by anaerobic organisms and decay production. The final purpose is one of alkalinity and water-softening processing of both natural and sewage waters. In this stage, the sludges are generally more of a neutral soil filler type which may become later either acid or base depending upon other ingredients from the treatment system. It is important to use marls rather than pure calcium carbonate because it is necessary to have a silica body to sink both insolubles and colloidals present in the water being treated immediately as the process of precipitation begins. Furthermore, it is important to use a marl of a high calcium carbonate content rather than marl clay which would be too low in calcium carbonate content and too high in silica content both chemically and economically. If the silica content is too high an excessive amount of the substance will be required so as to render the process commercially impracticable. Furthermore, the high silica content would result in the production of a sludge of a low fertilizing value. Also, it might result in the addition of an increased amount of silica to the silica-bearing water being treated. Also, if a high silica content is used in treating the water, it is injurious to the treating equipment because of its abrasive and scoriaceous nature.

The lime hydrate serves mainly as an alkalizer and as an agent in addition to the marl for releasing nascent oxygen in its reactions as a base with acid salts or direct acids in the natural or sewer waters. It is important to use lime hydrate or dolomitic lime hydrate instead of calcium oxide or unslaked lime. The unslaked lime when added to the water produces heat release and water absorption and calcium hydroxides of a highly alkaloid chemical consistency. These calcium oxides when added to marl clays and ferrous sulfate, as proposed in the prior art, produce calcium sulfate cement and only partial treatment organically and physically of the water with the creation of ferrous chlorides and ferric chlorides as solubles which are injurious to the health. Furthermore, the unslaked lime is a poisonous and dangerous chemical for inexperienced laborers and the public generally to use. On the other hand, dolomitic lime hydrate can be used by inexperienced labor without danger. Furthermore, it acts to effectively precipitate the organisms present in the water without the creation of halogens which are injurious to health. It acts as an organic alkalizer to certain acid-forming pathogens and their by-products. Also, the magnesium present in the dolomitic hydrate aids in the precipitation of a calcium-iron-magnesium sulfate as a flake rather than as a direct calcium sulfate and iron carbonate form of caked sludge.

When potassium tri-basic phosphate and sodium tri-basic phosphate are used, they function in substantially the same manner as ferrous ammonia sulfate relative to bacterial and pathogenic destruction. However, if the treated water is to be used for drinking purposes, it should be treated with a strong alkali solution made from the preferred composition hereinbefore referred to. The potassium and sodium tri-basic phosphates will only be used in those cases where the water has a high phosphoric acid content or sodium or potassium content with other allied acid salts, to remove the phosphorus, sodium and potassium as a sludge fertilizer.

If sodium carbonate is used, for example, in treating waters from paper pulp milling and cannery sludge treatment systems, the sodium and carbon dioxide and carbon monoxide in the sodium carbonate will unite with the carbohydrate radicals of the cellulose nitrates, cellulose sulfates, cellulose acetates, celluose halogens and cellulose phosphates to form a sludge of a highly organic fertilizer nature.

The marl in my composition will act with the sodium carbonate and the dolomitic lime hydrate as a neutralizing alkaloid in the elimination of any harmful or otherwise injurious chemical acids, acid salts, bases or hydroxide salts in either the original chemical mixtures or the derivative sludges. The ferrous ammonia sulfates also combine with the sodium carbonate, calcium carbonate of the marl, and calcium hydroxide or lime hydrate to form a neutral equilibrium balance of a non-injurious nature.

When sodium chloride or calcium chloride derived from brines are used, as previously indicated, they serve to precipitate soluble halogen salts. These salts are neutralized in the final sludge by the alkali reagents of my composition as described above.

In the purification of natural waters, wherein the waters are under normal temperature, pressure, rainfall, gradient fall per mile of flowage et cetera, the use of ferrous ammonia sulfate and high calcium carbonate content marls alone preferably as a 20 per cent ferrous ammonia sulfate and 80 per cent marl mix is sometimes sufficient. I may use from 5 to 30 per cent ferrous ammonia sulfate and 70 to 95 per cent marls. However, when natural or artificial stagnation occurs or when treating sewerage waters, the formula previously mentioned and including the lime hydrate must be used.

When treating natural waters for drinking purposes, my composition is mixed with the waters preferably under agitation, coagulation, and aeration processings.

In treating sewerage waters, the composition which I have described herein, is mixed with the water to be treated preferably under agitation. After being thoroughly agitated, the mixture is allowed to sludge onto a bar screen conveyor which leads to settling tanks. The water then passes through an aerator and comminutor hook-up and then through separating screens into the by-pass outlet leading back into the original water channels as under the present systems of engineering plant lay-outs now advocated.

It will be apparent from the above description that my process and composition for treating natural or sewerage waters has many advantages. All of the undesirable substances will be precipitated from the waters and particularly those which are detrimental to human health. The composition which I use for treating the waters will completely destroy all pathogenic organisms, their by-products or other organic solubles, either decay, anaerobic, toxic or virus in type, and create a nascent oxygen content in the waters to replace the carbon dioxide and monoxide released from the above organics. My process will function to destroy all of the said organisms and their by-products through the wide range of temperatures which will be encountered in the treatment of such waters during the different seasons. I have found that my process will properly function through a temperature range of 4° F. to 212° F. In the treatment of sewerage waters, the precipitant will be in the form of a sludge which will have a high fertilizer value and will not be cementitious or cake-forming in its physical properties but will on the other hand be of a flaky and granular drying type. The composition which I use is comparatively cheap and the process may be performed economically either in small installations or large installations.

Many other advantages will be apparent from the preceding description and the following claims.

In the following claims the percentages of chemical substances employed are given as percentages by weight of the total chemicals used in treating the water.

Having thus described by invention, what I claim is:

1. The method of treating water, which comprises adding to the water, in amounts sufficient to kill substantially all bacteria, the composition which comprises as its essential ingredients from 5 to 30 per cent by weight ferrous ammonia sulfate and from 70 to 95 per cent by weight marls containing at least 25 per cent calcium carbonate, and removing from the water the substances formed by the chemicals added to the water.

2. The method of treating water, which comprises adding to the water, in amounts sufficient to kill substantially all bacteria, the composition which comprises as its essential ingredients 10 per cent by weight of ferrous ammonia sulfate, 30 per cent by weight marls containing at least 90 per cent calcium carbonate, and 60 per cent by weight white lime hydrate and removing from the water the substances formed by the chemicals added to the water.

3. The method of treating water, which comprises adding to the water, in amounts sufficient to kill substantially all bacteria, the composition which comprises as its essential ingredients from 2.5 to 20 per cent by weight ferrous ammonia sulfate, 25 to 60 per cent by weight marls containing at least 85 per cent calcium carbonate, and 25 to 75 per cent by weight lime hydrate, and removing from the water the substances formed by the chemicals added to the water.

4. A composition for treating water comprising as its essential ingredients 20 per cent by weight ferrous ammonia sulfate, and 80 per cent by weight marls containing at least 90 per cent calcium carbonate.

5. A composition for treating water comprising as its essential ingredients 10 per cent by weight of ferrous ammonia sulfate, 30 per cent by weight marls containing at least 90 per cent calcium carbonate, and 60 per cent by weight white lime hydrate.

6. The method of treating water, which comprises adding to the water, in amounts sufficient to kill substantially all bacteria, the composition which comprises as its essential ingredients from 2.5 to 20 per cent by weight ferrous ammonia sulfate, 25 to 60 per cent by weight marls containing at least 85 per cent calcium carbonate, 25 to 75 per cent by weight lime hydrate and .5 to 5 per cent by weight sodium carbonate, and removing from the water the substances formed by the chemicals added to the water.

7. The method of treating water, which comprises adding to the water, in amounts sufficient to kill substantially all bacteria, the composition which comprises as its essential ingredients from 2.5 to 20 per cent by weight of ferrous ammonia sulfate, 25 to 60 per cent by weight marls containing at least 85 per cent calcium carbonate, 25 to 75 per cent by weight lime hydrate, and .5 to 5 per cent by weight of a compound selected from the group consisting of sodium chloride and calcium chloride, and removing from the water the substances formed by the chemicals added to the water.

8. The method of treating water, which comprises adding to the water, in amounts sufficient to kill substantially all bacteria, the composition which comprises as its essential ingredients from 2.5 to 20 per cent by weight of ferrous ammonia sulfate, 25 to 60 per cent by weight marls containing at least 85 per cent calcium carbonate, 25 to 75 per cent by weight lime hydrate, .5 to 5 per cent by weight of sodium carbonate and .5 to 5 per cent by weight of a compound selected from the group consisting of sodium chloride and calcium chloride, and removing from the water the substances formed by the chemicals added to the water.

PHILLIP C. SCHNEIDER.

CERTIFICATE OF CORRECTION.

Patent No. 2,310,655.  February 9, 1943.

PHILLIP C. SCHNEIDER.

It is hereby certified that error appears in the printed specification of the above numbered patent requiring correction as follows: Page 4, first column, line 31, for "25 per cent" read --85 per cent--; and that the said Letters Patent should be read with this correction therein that the same may conform to the record of the case in the Patent Office.

Signed and sealed this 1st day of June, A. D. 1943.

(Seal)

Henry Van Arsdale,
Acting Commissioner of Patents.